(12) United States Patent
Jacobs et al.

(10) Patent No.: US 7,532,463 B2
(45) Date of Patent: May 12, 2009

(54) MOVEABLE PLATFORM FOR A LAPTOP COMPUTER

(76) Inventors: Carl V. Jacobs, 2201 SE. St. Andrews Blvd. Apt. 14, Bentonville, AR (US) 72712; Donald W. Hitt, 2613 Horizon Blvd., Rogers, AR (US) 72758

( * ) Notice: Subject to any disclaimer, the term of this patent is extended or adjusted under 35 U.S.C. 154(b) by 0 days.

(21) Appl. No.: 11/820,661

(22) Filed: Jun. 20, 2007

(65) Prior Publication Data

US 2008/0316692 A1 Dec. 25, 2008

(51) Int. Cl.
*H05K 5/00* (2006.01)
(52) U.S. Cl. .................. 361/683; 248/442.2; 312/223.3; 455/63.3
(58) Field of Classification Search .................. 707/206, 707/102, 3; 312/223.2–223.3; 455/63.3, 455/439; 380/277, 201; 248/346.1, 316.1, 248/176.3, 442.2, 118.3; 361/679–687, 724–727
See application file for complete search history.

(56) References Cited

U.S. PATENT DOCUMENTS

| 5,927,669 | A | 7/1999 | Sassman |
| 6,179,264 | B1 | 1/2001 | Moy et al. |
| 6,367,748 | B1 | 4/2002 | Solomon et al. |
| 6,691,961 | B2 | 2/2004 | Solomon et al. |
| 7,137,603 | B2 | 11/2006 | Solomon et al. |
| 2004/0183747 | A1* | 9/2004 | Bowen ........................ 345/1.1 |
| 2006/0054751 | A1* | 3/2006 | Johnson et al. ......... 248/123.11 |
| 2006/0150869 | A1* | 7/2006 | Cvek ........................... 108/25 |
| 2006/0250764 | A1* | 11/2006 | Howarth et al. ............. 361/683 |

* cited by examiner

*Primary Examiner*—Hung V Duong
(74) *Attorney, Agent, or Firm*—William Propp, Esq.

(57) ABSTRACT

A moveable platform for a laptop computer has an angled support base to angle the laptop keyboard and elevate the laptop display monitor. The angled support base forms an airgap between the moveable platform and the desktop to dissipate the heat from the laptop computer. A separate cooling fan system integral with the support base can also dissipate the laptop computer heat. Spherical roller assemblies on the bottom of the platform move the laptop computer around the desktop. The spherical roller assemblies have a Teflon™ spherical ball surrounded by a plurality of Delrin™ spherical ball bearings in a Nylon™ semi-spherical cavity. These non-metallic materials provide smooth quiet operation with minimal frictional resistance and are non-abrasive to the desktop surface. A braking mechanism at the front of the moveable platform lifts the front spherical roller assemblies from contact with the desktop to lock the moveable platform and laptop computer into position on the desktop.

15 Claims, 7 Drawing Sheets

MOVEABLE PLATFORM FOR A LAPTOP COMPUTER

BACKGROUND OF THE INVENTION

This invention relates generally to a platform for a laptop computer and, more particularly, this invention is directed to a moveable platform for a laptop computer.

Laptop computers, often referred to as notebook computers, are used extensively by people that seek computer availability while traveling and at a variety of locations.

Laptops offer an alternative to bulkier, space consuming desktop computers, with the opportunity to readily take the laptop to lectures, business meetings, or the like.

The reduction in the size and weight of today's laptop computers render them indispensable to travelers and business people.

A laptop computer has become the computer of choice. Many people continue to use the laptop computer in an office or home environment over a desktop computer, from force of habit and the need for access to files on the laptop.

As a result, users are often required to operate the laptop computer directly on an adjacent desk or table.

Laptop computers are basically comprised of a base structure and a display monitor pivotally attached to one another. The base structure houses the keyboard, the processing unit, hard drive, optical drives, USB ports and other electrical components. The base structure and display monitor of the laptop computer are folded into a compact flat structure when not in use.

The laptop computer is formed as a single unit for compactness, to enable it to be safely transported and prevent any parts from being lost, mislaid or otherwise separated from the device.

Due to that design, laptop computers often require the user to assume uncomfortable and unhealthy positions for extended periods of time during use of the laptop computer.

Laptop computers have relatively small and ergonomically incorrect keyboards. The keyboard on the base structure of the laptop is positioned parallel to the desktop surface upon which the base structure of the laptop is located. Typing or other keyboard activities are difficult for the user with a flat keyboard over extended periods of time.

The display monitor for a laptop computer on a desktop or tabletop surface is also ergonomically incorrect. The monitor will be below the eye level of the user causing eyestrain, and neck and back strain during the longer periods of operation that have become common.

The processing unit, hard drive, optical drives and battery power sources of the laptop computer generate substantial heat during operation of the laptop. These electronics elements are typically located in the base structure of the laptop computer.

In most desktop computers, there are fans, heat sinks and adequate airspace to dissipate the heat generated by the electronics elements of the computer. However, in a laptop computer there is very little room for large fans or open airspace, so heat is dissipated through the bottom surface of the base structure of the laptop computer. A laptop computer may have metal or plastic 'feet' on the bottom surface to provide a thin airgap for cooling beneath the laptop.

The thin airgap may not be able to dissipate the heat over prolonged use of the computer causing the laptop to overheat or at least impair the operation of the computer. The flat hard surface of a desktop or tabletop will reflect heat back into a laptop computer located on the desktop or tabletop surface.

Laptop computers are not designed to be moved on a desktop or tabletop. The bottom surface of the base structure of the laptop computer at best has plastic or metal 'feet' which allow the laptop to be dragged along the desktop.

The 'feet' may scratch, dull, or otherwise mar the surface when being moved across the desktop. The 'feet' are also noisy when being moved along the surface of the desktop.

The 'feet' do not lock the laptop computer into position on the surface of the desktop. The lightweight nature of a laptop computer allows it to shift easily on the surface of the desktop, when the desk, the computer or the user inadvertently or deliberately moves.

A flat mobility assembly beneath a laptop computer is used to move the laptop on a desktop or tabletop in U.S. Pat. No. 6,367,748 and related U.S. Pat. Nos. 6,691,961 and 7,137,603. Eight conventional revolving members in an X pattern on the undersurface of the assembly provide the mobility.

The revolving members can be disengaged to retreat into a cavity to rest the laptop computer on feet. Alternately, a rotating locking mechanism, an eyelid cover or a push-button selector can apply friction to the revolving member to stop the mobility assembly.

However, the conventional revolving members of these prior art patents are noisy when being used to move the laptop computer. The conventional revolving members can also mar the surface by scratching or dulling the shine of the desktop or tabletop when the laptop computer is being moved.

The flat mobility assembly also has the same heat dissipation problems as the flat bottom surface of the base structure of the laptop computer. The thin airgap between the flat mobility assembly and the desktop does not effectively dissipate the heat from the laptop computer.

Similarly, the flat mobility assembly also has the same keyboard and display monitor ergonomical problems as the laptop computer. The flat keyboard will cause hand problems for a prolonged user of the laptop computer and the low display monitor will cause eyestrain for the user.

It is an object of the present invention to provide a moveable platform for a laptop computer that is quiet and is low abrasion on a desktop or tabletop.

It is another object of the present invention to provide a moveable platform for a laptop computer that quickly and easily dissipates the heat from the operation of the laptop computer.

It is yet another object of the present invention to provide a moveable platform for a laptop computer that has an ergonomically correct keyboard on the base structure of the laptop computer and an ergonomically correct display monitor of the laptop computer.

SUMMARY OF THE INVENTION

According to the present invention, a moveable platform for a laptop computer supports the laptop computer on an angled support base of the moveable platform. The angled support base will tilt the keyboard of the base structure of the laptop computer relative to the computer user to reduce wrist sprain and elevate the display monitor of the laptop computer relative to the computer user to reduce eyestrain.

The platform moves the laptop computer on a desktop surface. The angled support base forms an airgap between the moveable platform and the desktop to dissipate the heat from the laptop computer. The heat flows from the base structure of the laptop computer through the aluminum alloy base structure to the airgap.

A separate cooling fan system integral with the support base can also dissipate the heat from the laptop computer. A pair of vent-holes extends from the upper surface of the support base through the support base to the lower surface of the support base to the airgap. A cooling fan in each vent-hole will draw heated air from the base structure of the laptop computer through the vent-hole to discharge the heated air into the airgap to dissipate the heat from the laptop computer.

The support base is between the footer section and the header section of the moveable platform. The header section is taller than the footer section, causing the support base to be angled forward of approximately 5 to 15 degrees, but preferably 8 degrees, relative to the desktop and the computer user.

The lower end of the base structure of the laptop computer rests against the ledge of the footer section.

Spherical roller assemblies are mounted on the bottom of the platform to move the laptop computer around the desktop. The footer section has two spherical roller assemblies and the header section has two spherical roller assemblies.

The spherical roller assemblies have a Teflon™ spherical ball surrounded by a plurality of Delrin™ spherical ball bearings in a Nylon™ semi-spherical cavity of the spherical roller assembly housing. An annular retaining ring of metal, plastic or polymer restrains the spherical ball and ball bearings within the cavity.

These non-metallic materials for the ball, ball bearings and cavity of the spherical roller assemblies provide smooth quiet operation with minimal frictional resistance and are non-abrasive to the desktop surface.

A portion of the spherical ball extends out through the hole in the annular ring to contact and revolve against the desktop surface to move the platform and laptop computer on the desktop.

A braking mechanism at the front of the moveable platform will elevate the front spherical roller assemblies from contact with the desktop, locking the platform and computer in position on the desktop. When the braking mechanism is released, the front spherical roller assemblies will be in contact with the desktop and the platform will be moveable about the desktop.

The braking mechanism has a reverse J-shaped lever on each side of the moveable platform interconnected by a rotatable shaft through the footer section. Each lever has a flat handle and a curved brake section. By raising one or both lever handles, the lever brake is removed from contact with the desktop surface allowing the platform and laptop computer to move on the desktop. By lowering one or both lever handles, the lever brake contacts with the desktop surface locking the moveable platform and laptop computer into a stationary position on the desktop. Once set, a cam positively locks the brake in that state. The curved brake will have a skid or slip resistance material covering or ridges.

Alternately, the spherical roller assemblies can be mounted on the lower surface of the laptop computer to platform move the laptop computer around the desktop without the use of a separate platform. A braking mechanism at the front of the laptop computer can lock the laptop computer in position on the desktop.

Other aspects of the invention will become apparent from the following more detailed description, taken in conjunction with the accompanying drawings.

BRIEF DESCRIPTION OF THE DRAWINGS

The preferred embodiments of this invention will be described in detail, with reference to the following figures wherein.

DETAILED DESCRIPTION OF PREFERRED EMBODIMENTS

Figure 1:
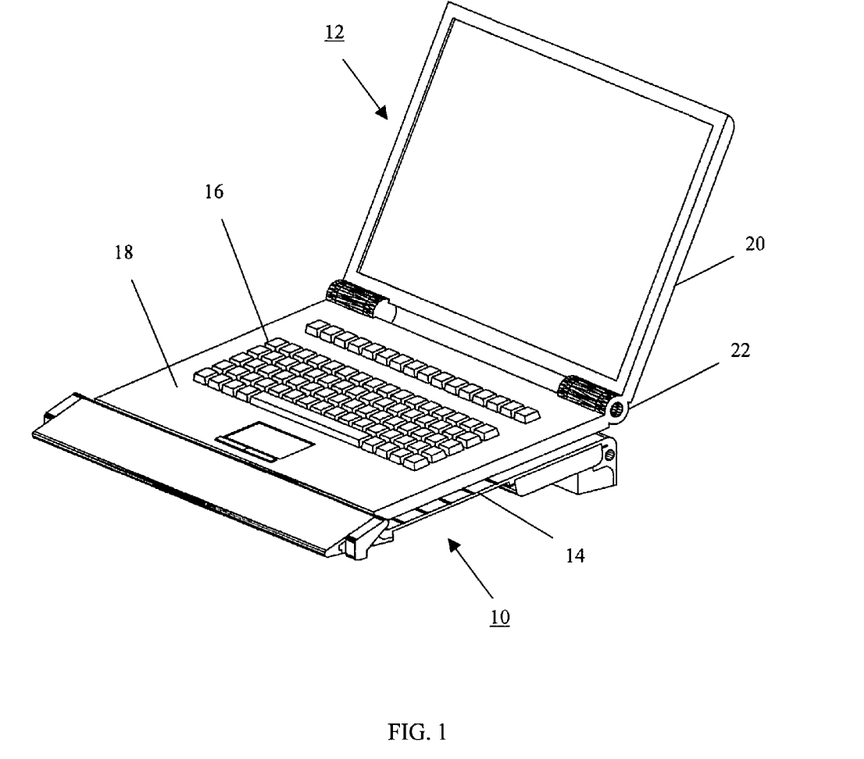
FIG. 1 is a perspective view of a moveable platform for a laptop computer of the present invention.

Reference is now made to FIG. 1 illustrating a moveable platform 10 for a laptop computer 12, which supports the laptop computer on an angled support base 14 of the moveable platform.

The laptop computer 12 has a keyboard 16 housed in a generally flat rectangular base structure 18. The display monitor 20 is connected by a hinge 22 to the base structure 18. The processing unit, hard drive, optical drives, USB ports and other electrical components of the laptop computer are in the base structure.

When the laptop computer is not in operation or when the laptop computer is being stored, the display monitor is usually folded flat over the base structure to provide a compact structure.

Figure 2:
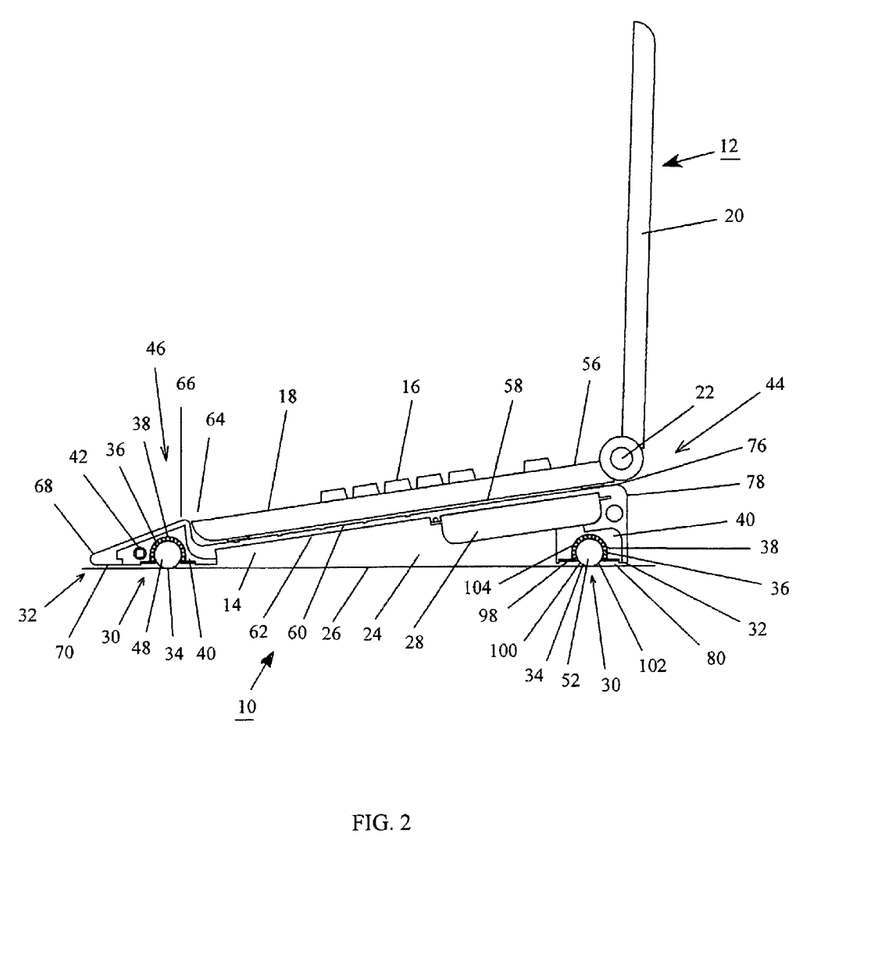
FIG. 2 is a side view of a moveable platform for a laptop computer of the present invention.

As best seen in FIG. 2, the moveable platform 10 has an angled support base 14, which tilts the keyboard 16 of the laptop base structure 18 while elevating the display monitor 20 of the laptop 12.

The angled support base 14 forms an airgap 24 between the moveable platform 10 and the desktop 26. The angled support base 14 has an integral cooling system 28 to dissipate heat from the laptop 12 through the airgap 24.

The moveable platform 10 has spherical roller assemblies 30 on the bottom surface 32 of the platform 10 to move the computer 12 and platform 10 on the desktop 26. The spherical ball 34, the spherical ball bearings 36 and the semi-spherical cavity 38 in their housing 40 are all non-metallic to allow low rolling effort, quiet operation and no abrasion of the desktop.

Figure 3:
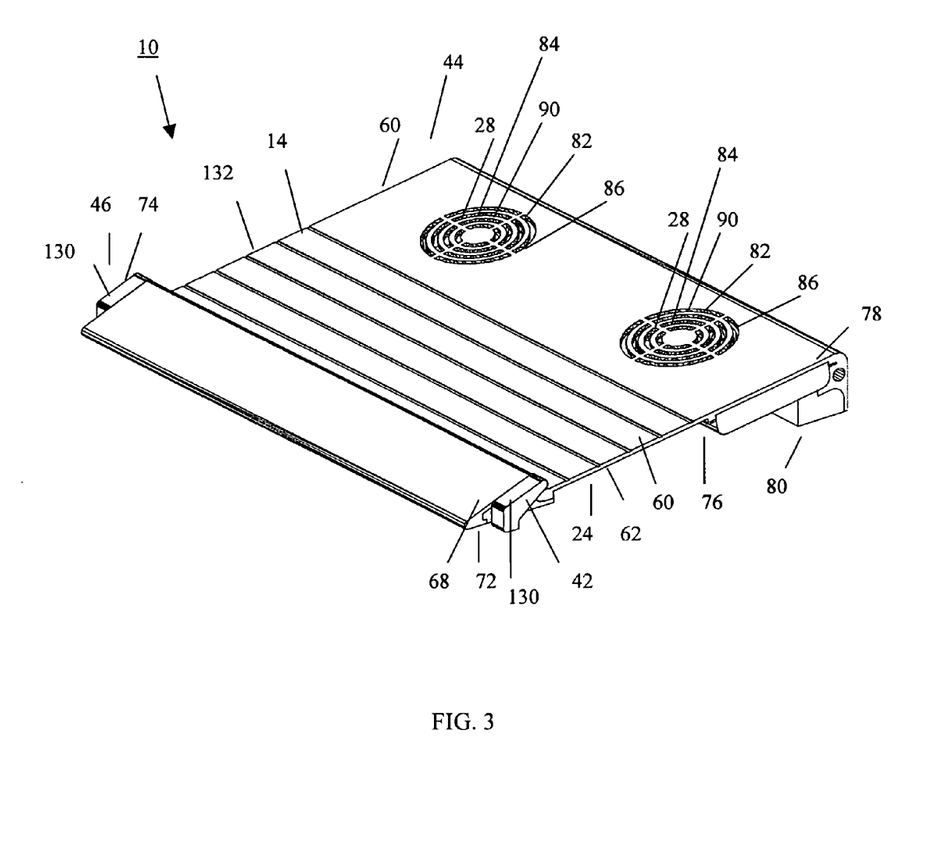
FIG. 3 is a top perspective view of a moveable platform for a laptop computer of the present invention.
Figure 4:
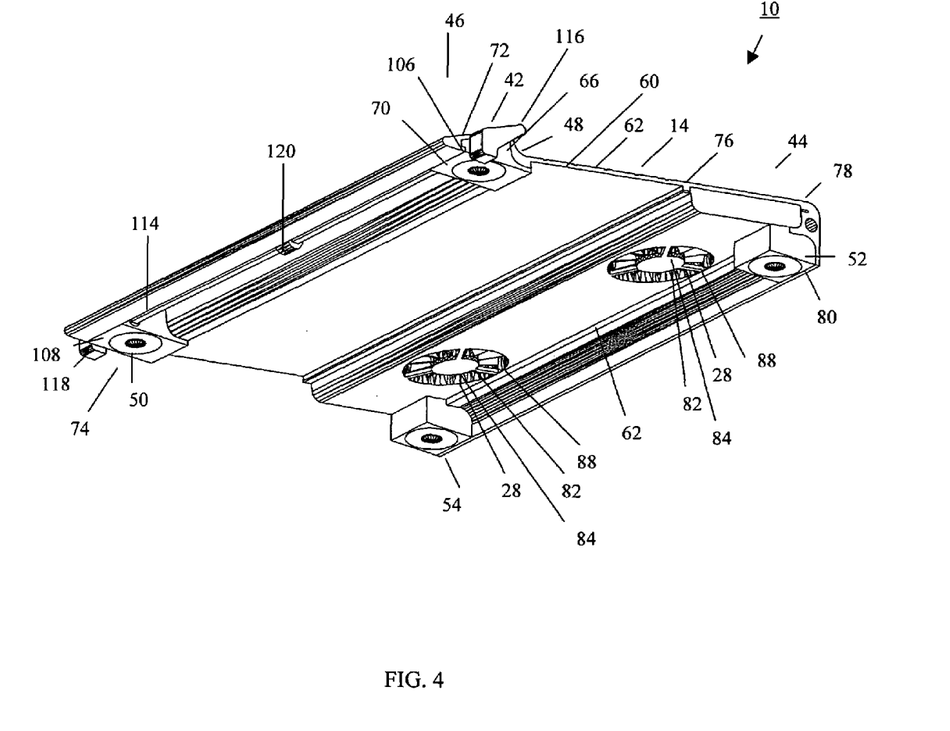
FIG. 4 is a bottom perspective view of a moveable platform for a laptop computer of the present invention.

As best seen in FIG. 3 and FIG. 4, the moveable platform 10 has a front braking mechanism 42, which elevates the front spherical roller assemblies 30 locking the platform 10 and computer 12 in position on the desktop 26.

As best seen in FIG. 2, FIG. 3 and FIG. 4, the moveable platform 10 has an elevated header section 44, an angled support base 14 and a footer section 46. The header section, support base and footer section are aluminum alloy formed by extrusion with an anodized finish. The aluminum alloy is preferably aluminum alloy 6063.

The front braking mechanism 42 and the two front spherical rollers 48, 50 are mounted in the footer section 46. The two back spherical rollers 52, 54 are mounted in the header section 44.

Returning to FIG. 2, the keyboard 16 is on the upper surface 56 of the base structure 18 of the laptop computer 12 while the lower surface 58 of the base structure 18 is on the upper surface 60 of the support base 14 of the moveable platform 10.

The support base 14 of the moveable platform 10 has a rectangular planar upper surface 60 and an opposing rectangular planar lower surface 62. The upper surface 60 of the support base 14 corresponds generally to the shape of the rectangular lower surface 58 of the base structure 14 of the laptop computer 12.

The footer section 46 is at the lower end 64 of the support base 14. The footer section 46 has a narrow support ledge 66. The support ledge 66 extends upward at approximately a right angle to the upper surface 60 of the support base 14.

Returning to FIG. 2, FIG. 3 and FIG. 4, the two front spherical rollers 48, 50 are mounted in the footer section 46 in front of the support ledge 66. The upper surface 68 of the footer section 46 covers the spherical rollers while the spherical rollers extend out of the lower surface 70 of the footer section 46.

The braking mechanism 42 is mounted in the footer section 46 in front of the two front spherical rollers 48, 50 and the support ledge 66. The upper surface 68 of the footer section 46 covers the braking mechanism 42 while the braking mechanism 42 extends out of the two side surfaces 72, 74 and the lower surface 70 of the footer section 46.

The header section 44 is at the upper end 76 of the support base 14. The header section 44 is on the opposite side of the support base 14 from the footer section 46. The upper surface 78 of the header section 44 is contiguous and parallel to the upper surface 60 of the support base 14.

The two back spherical rollers 52, 54 are mounted in the header section 44. The upper surface 78 of the header section 44 covers the spherical rollers 52, 54 while the spherical rollers extend out of the lower surface 80 of the header section.

The laptop computer 12 is placed on the rigid support base 14 of the moveable platform 10. The lower end 64 of the base structure 18 of the laptop rests against the ledge 66 of the footer section 46. The support base and ledge will keep the laptop computer in the same position on the base structure when the moveable platform is moving or is stationary.

The support base 14 of the moveable platform is between the header section 44 and the footer section 46. The height of the header section on the desktop is greater than the height of the footer section on the desktop, thus causing the support base to be angled forward relative to the desktop 26 and the header and footer section. The support base is angled approximately 5 to 15 degrees, but preferably 8 degrees, relative to the desktop. The ledge of the footer section restrains the base structure of the laptop computer in position on the support base and prevents the base structure of the laptop computer from sliding towards the computer user or off the platform.

The angled support base 14 will ergonomically slope the keyboard 16 of the base structure 18 of the laptop computer towards the user. The sloping keyboard helps align the hand, wrist and forearm of the user for easier and more comfortable typing, particularly over extended periods of use over time. The sloping keyboard is more accessible to the hands of the user. The sloping keyboard is more visible to a non-touch typist.

The upper surface 68 of the footer section 46 also provides a wrist rest for the user while operating the computer.

The display monitor 20 extends vertically from the upper end 76 of the support base 14 and header section 44 at an angle greater than 90 degrees from the upper surface 76 of the support base 14 and upper surface 78 of the header section 44.

The display monitor 20 of the laptop computer 12 extends upward from the header section 44 of the moveable platform 10. The header section 44 is raised relative to the base structure 14 and the footer section 46, thus the moveable platform raises the display monitor of the laptop computer relative to the user. The raised display monitor lessens the viewing angle of the user and reduces the eyestrain of the user, as well as neck and back strain of the user.

The angled base structure of the moveable platform tilts the keyboard of the laptop while elevating the display monitor of the laptop.

An airgap 24 is formed between the angled support base 14 of the moveable platform 10 and the desktop 26. The airgap 24 will angle up from the footer section 46 to the header section 44. The airgap 24 will be rectangular and increasing in area in cross-section in the x-z plane and rectangular and the same area in cross-section in the y-z plane.

The base structure 18 of the laptop computer 12 with the electronics components and power source will generate heat from the operation of the laptop.

The support base 14 of the moveable platform 10 is formed from aluminum alloy, preferably aluminum alloy 6063, to cool the laptop computer 12 by absorbing and dissipating heat away from the base structure 18 of the laptop computer 12.

Heat will flow from the bottom surface 58 of the base structure 18 of the laptop 12 to the adjacent upper surface 60 of the support base 14.

Cold air will flow from the airgap 24 below the support base 14 of the platform 10 cooling the support base 14.

The cooler support base of the moveable platform will dissipate the heat from the base structure of the laptop computer by passive convection cooling.

An increased angle for the support base will increase convection cooling.

The angled support base 14 has an integral cooling system 28 to dissipate heat from the laptop 12 through the airgap 24.

As best seen in FIG. 3 and FIG. 4, the cooling system 28 has a pair of vent-holes 82 with a cooling fan 84 in each hole. The vent-hole 82 extends from the inlet 86 at the upper surface 60 of the support base 14 through the support base 14 to the outlet 88 at the lower surface 62 of the support base 14.

A baffle 90 covers the vent-hole 82 at the inlet 86 at the upper surface 60. The cooling fan 84 is positioned in the vent-hole 82 between the upper surface 60 and the lower surface 62 of the support base 14. The flat-type cooling fan 84 includes a fan blade 92, an electric motor 94 and a power source 96. The power source drives the electric motor, which rotates the fan blade. The substantially round cooling fan 84 matches the circular vent-hole 82.

The power source can be the USB port on the laptop computer or an ancillary external power source. A switch or control circuit (not shown) can control the operation of the fan.

The fans of the cooling system draw heated air away from the base structure of the laptop computer through the inlet of the vent-holes, through the vent-holes in the support base, and discharges the heated air out the outlet into the airgap between the support base of the moveable platform and the desktop to provide forced-air convection cooling of the laptop. The angled moveable platform elevates the computer above the desktop, thus providing additional airgap space for the heat emitted from the computer to escape through the vent-holes.

The forced-air active convection cooling by the fans will remove more heat from the laptop computer than the tilted moveable platform alone, which provides passive convection cooling.

The cooling fan could alternately blow cool air from the airgap through the platform against the base structure of the laptop with the resulting heated air escaping around the laptop computer on the platform.

Spherical roller assemblies 30 are mounted in the footer section 46 and the header section 44 to allow the platform 10 and laptop computer 12 to move on the desktop surface 26.

Figure 5:
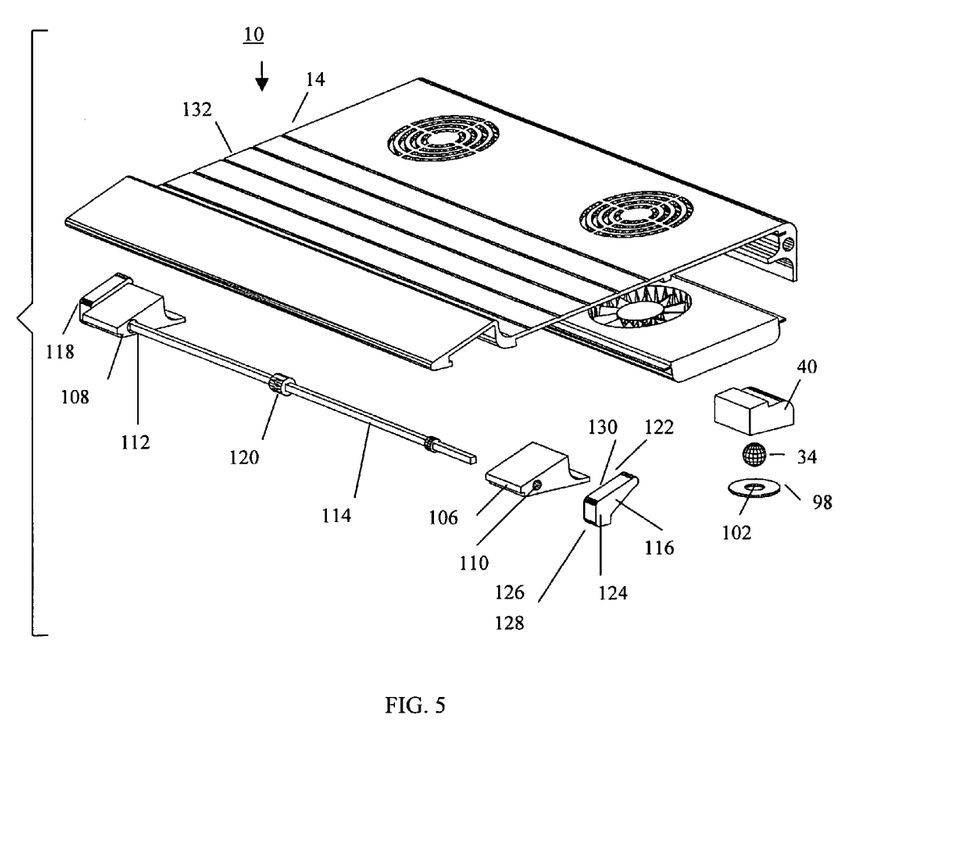
FIG. 5 is an exploded view of a moveable platform for a laptop computer of the present invention.
Figure 6:
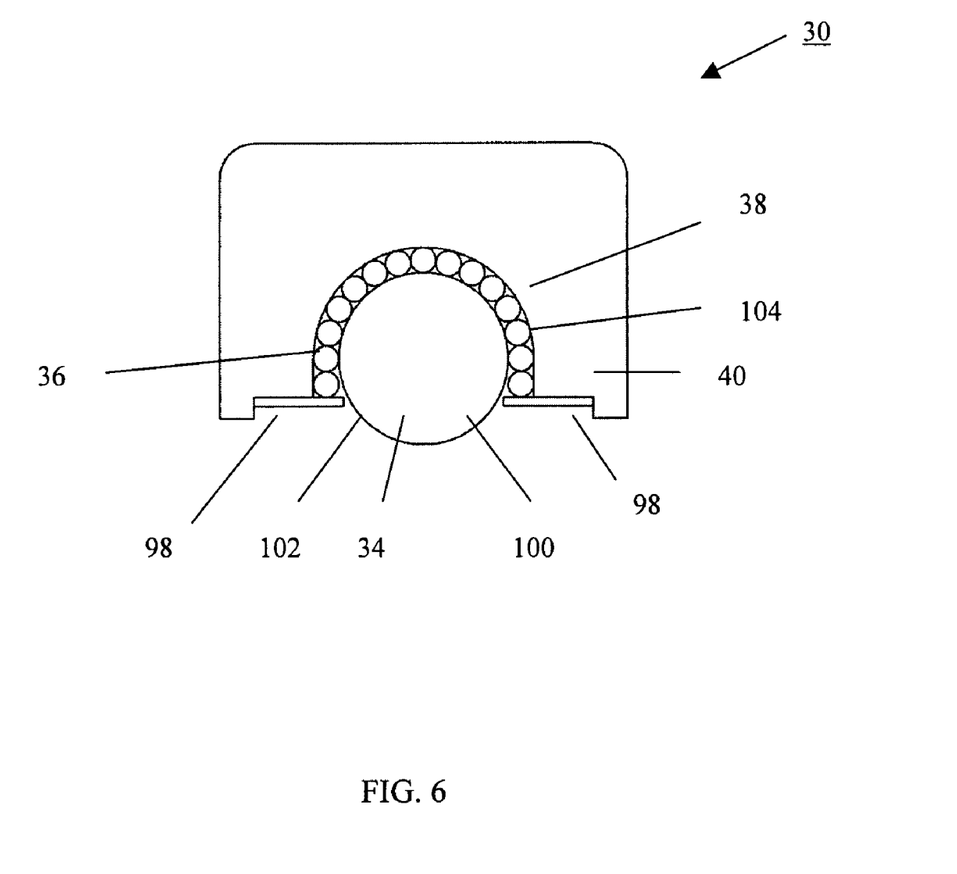
FIG. 6 is a side view of the spherical roller assembly of the present invention.

As best seen in FIG. 2, FIG. 5 and FIG. 6, the spherical roller assembly 30 has a single spherical ball 34 surrounded by a plurality of smaller spherical ball bearings 36 within a semi-spherical cavity 38 of the spherical roller assembly housing 40. An annular retaining ring 98 restrains the spherical ball and ball bearings within the cavity.

A portion 100 of the spherical ball 34 extends out of the hole 102 in the annular retaining ring 98 to contact and revolve the spherical ball on the desktop 26.

The spherical ball is formed of Teflon™, the ball bearings are formed of Delrin™ and the semi-spherical cavity is formed of Nylon™, Teflon™, Delrin™ and Nylon™ are all non-metallic materials.

The diameter of the inside surface of the semi-spherical cavity is greater than the diameter of the spherical ball. The diameters of the spherical balls and two spherical ball bearings approximately equals the diameter of the inside surface of the semi-spherical cavity.

The spherical ball 34 only physically contacts the ball bearings 36 within the cavity 38 of the housing 40. The spherical ball 34 does not physically contact the inside surface 104 of the semi-spherical cavity 38.

The spherical ball 34 will also physically contact the surface of the desktop 26 through the retaining ring 98.

The plurality of ball bearings 36 forms concentric rows of spherical ball bearings around the spherical ball 34 within the semi-spherical cavity 38. The circumference of a row of ball bearings will be slightly greater than the diameter of the circle on the spherical ball encircled by that row of ball bearings.

The retaining ring 98 is secured to the roller housing 40 by an adhesive, by screws through the retaining ring to the housing, or by threading on the retaining ring and threading on the housing allowing the ring to be screwed into position.

The spherical ball can freely rotate relative to the ball bearings inside the cavity. The ball bearings will rotate counter to the rotation of the spherical ball. The spherical ball will also freely rotate along the desktop moving the platform and laptop computer on the desktop.

The combination of a Teflon™ spherical ball surrounded by a plurality of Delrin™ spherical ball bearings in a Nylon™ semi-spherical cavity for a spherical roller allows the platform and laptop computer to move freely in any direction on the desktop and to rotate at any point on the desktop to perfectly position the platform and laptop computer where the user wants them on the desktop.

The use of a Teflon™ spherical ball rotating with Delrin™ ball bearings allows for unrestrained movement of the spherical ball across the desktop with smooth operation and only minimal frictional resistance. The unique combination of non-metallic materials with the Teflon™ spherical ball, Delrin™ ball bearings and Nylon™ semi-spherical cavity provides for quiet, low noise operation when the platform is moving on the spherical balls.

The Teflon™ spherical ball is non-abrasive to the surface of the desktop as the spherical ball rotates across the desktop. The Teflon™ spherical ball will not scratch, mar or scuff the desktop surface.

The moveable platform 10 requires at least three spaced spherical roller assemblies for movement across the desktop. As best seen in FIG. 4, the present embodiment shows four spherical rollers; two spaced, opposed spherical rollers 48, 50 positioned in the front of the platform mounted in the footer section 46 and two spaced, opposed spherical rollers 52, 54 positioned in the back of the platform mounted in the header section 44.

The spherical rollers are positioned near the outer edges of the bottom of the support base 14 for stability of the moveable platform and laptop computer at stationary rest and in motion. The spherical rollers are also positioned near the outer edges of the bottom of the support base to more evenly distribute the weight of the laptop computer on the platform. The spherical rollers are approximately equidistant for those same stability and weight distribution requirements.

The spherical roller assemblies could alternately be mounted on the bottom surface of the support base of the moveable platform.

The front braking mechanism 42 of the moveable platform will elevate the front spherical roller assemblies 48, 50 from contact with the desktop 26, locking the platform 10 and computer 12 in position on the desktop 26. When the braking mechanism is released, the front spherical roller assemblies will be in contact with the desktop and the platform will be moveable about the desktop.

The braking mechanism 42 is mounted in the footer section 46 in front of the two front spherical rollers 48, 50 and the support ledge 66.

As best seen in FIG. 3, FIG. 4 and FIG. 5, the footer section 46 has a first bracket 106 and a second bracket 108 as opposing, spaced sidewalls. The first bracket 106 has a lateral hole 110 and the second bracket 108 has a lateral hole 112. The lateral holes are generally circular in cross-section. The pair of lateral holes is aligned across the footer section.

The braking mechanism 42 has a long shaft 114 extending through the lateral hole 110 of the first bracket 106 across the interior of the footer section 46 and through the lateral hole 112 of the second bracket 108.

The shaft 114 is generally circular in cross-section. The diameter of the shaft is less than the diameter of the lateral holes. The shaft can rotate freely inside the lateral holes.

The braking mechanism 42 also includes a first lever 116 attached to one end of the shaft 114 outside the first bracket 106 and the footer section 46 of the moveable platform 10 and a second lever 118 attached to the opposite end of the shaft 114 outside the second bracket 108 and the footer section 46 of the moveable platform 10. The first and second levers 116, 118 are on opposite sides of the braking mechanism 42 and footer section 46 and interconnected by the common shaft 114.

A cylindrical cam 120 is positioned around the shaft 114 within the footer section 46 between the first and second brackets 106, 108.

Each lever 116, 118 is reverse J-shaped with the long upper portion of the lever forming a handle 122 and the curved lower portion of the lever forming a brake 124. The brake portion of the lever has a low abrasion skid resistance covering 126 of rubber and lateral slip resistance ridges 128 of plastic on the outer curved surface.

In the locked position for the braking mechanism, the brake portion 124 of the lever and its skid resistance covering 126 and lateral ridges 128 engage the surface 26 of the desktop, elevating the moveable platform 10. The main spherical ball 34 in each of the two front spherical roller assemblies 48, 50 is removed from contact with the desktop. The two levers 116, 128 provide fixed points for the platform, which is locked into a stationary position on the desktop. The back edge 130 of the handle portion of the lever is aligned with the upper surface 68 of the footer section.

To release the braking mechanism, one or both lever handles 122 are pulled upward by the user so that the levers will form an approximate 90 degree right angle with the upper surface 68 of the footer section. The brake portion 124 of the lever disengages and moves away from the surface of the desktop, lowering the moveable platform. The main spherical ball 34 in each of the two front spherical roller assemblies 48, 50 contacts the desktop 26. All four spherical roller assemblies contact the desktop and the platform is moveable on the desktop. The four spherical rollers allow the platform to move in any x-y direction.

If one lever handle is pulled upward, since both levers are connected by the shaft, then both lever handles move upward. The connective shaft causes the levers to always act in unison, which in turn causes the brake portions of the levers to always act in unison.

The cylindrical cam 120 can lock in position against an interior surface (not shown) of the footer section 46 when the braking mechanism is locked and the platform is stationary, with the torque transmission shaft 114 acting as a spring for the cam lock.

Support bearings (not shown) can surround the shaft 114 inside the lateral holes 110 and 112 to aid in alignment of the shaft and rotation of the shaft.

The upper surface of the support base of the moveable platform can be configured to have a high coefficient of friction to hold the laptop computer in a slip-resistant, non-skid, manner. The non-skid property of the upper surface of the support base can be achieved by texturing the upper surface with ridges 132 as shown in FIG. 3 and FIG. 5 or other geometric shapes or by adding a non-skid material layer or other retaining means to the upper surface.

The upper surface can be textured to increase the friction coefficient and increase the resistance to slipping or skidding by roughing the surface or by adding bumps, points, ridges or other shapes above or below the upper surface. The texturing of the upper surface can be done during the initial manufacture of the support based of the moveable platform or post-manufacture in a separate step.

Alternately, an anti-skid material layer can be formed on the upper surface of the support base to reduce slippage of the laptop computer on the upper surface. The anti-skid material layer may be a high tactile adhesive coating such as a polymer, rubber, fabric, composite, plastic or polyurethane.

The laptop computer can alternately be secured in place on the upper surface of the support base by retaining means such as hook and loop tape (Velcro™) on the lower surface of the base structure of the laptop and upper surface of the support base of the platform. The laptop can be secured to the moveable platform by attachments at selected points of the base structure to the support base.

Straps can be positioned from a first position on the support base of the moveable platform across the base structure of the laptop computer to a second position on the support base. For example, the straps can secure the corners of the base structure to the corners of the support base.

Similarly, a pair of ledges can form a right angle at each of the two corners of the footer section of the support base to restrain and position the laptop computer on the platform.

The support base of the moveable platform can alternately be formed from any suitable rigid material such as other metals such as stainless steel and titanium and other aluminum alloys.

USB ports and media card readers can be incorporated into the moveable platform to allow connectivity of data and ancillary devices.

The fan assembly housing can have a mini USB port and two additional USB ports. An USB cable will provide connection from one of the USB ports on the laptop to the mini USB port on the fan assembly, which provides power for the fans and the media card readers included in the fan assembly housing. These various ports are all located at the end of the fan housing facing outward. A mini CD can be included in the fan assembly housing, which has the drivers for the media card reader (if needed).

Figure 7:
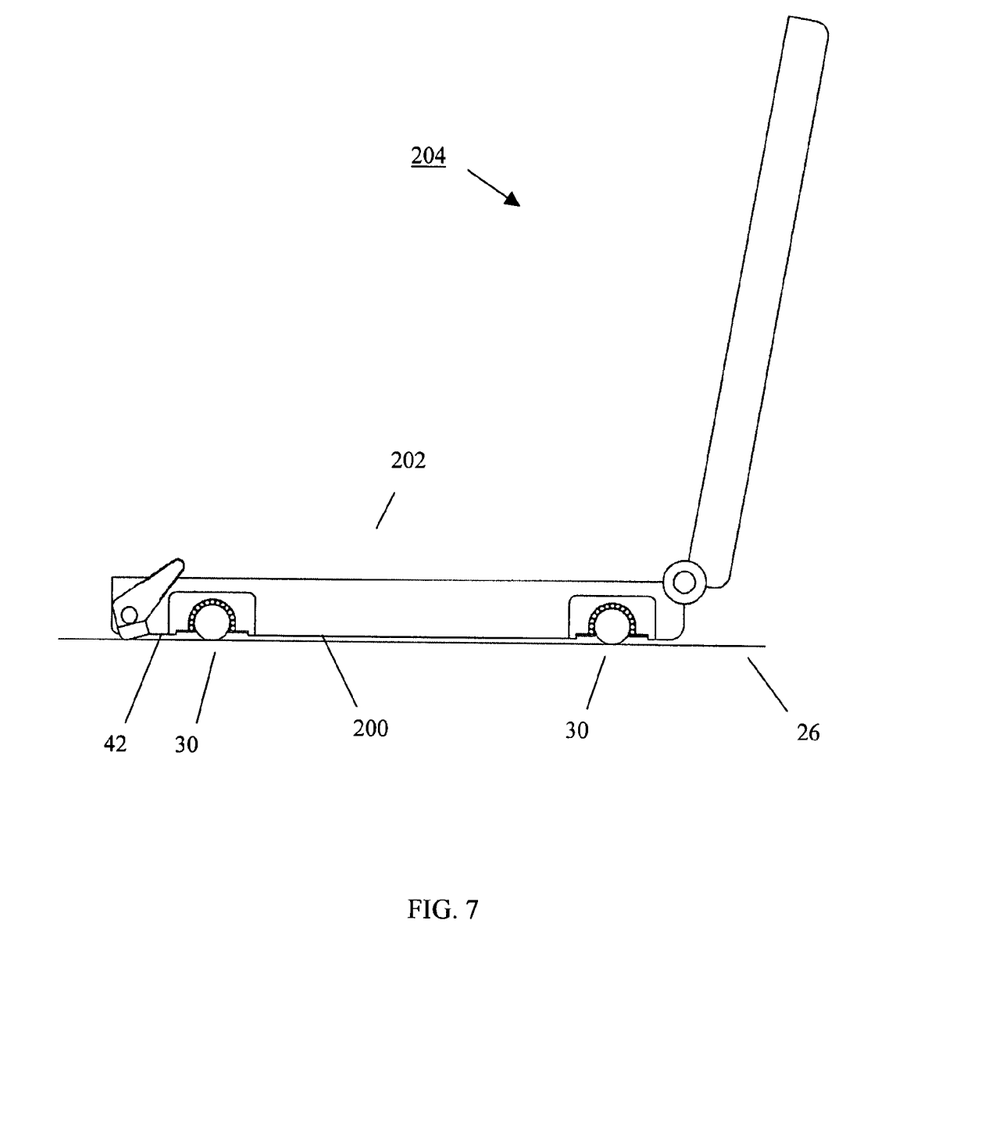
FIG. 7 is a side view of a laptop computer with spherical roller assemblies of the present invention.

Alternately as seen in FIG. 7, the spherical roller assemblies 30 can be mounted in the lower surface 200 of the base structure 202 of the laptop computer 204 to allow the laptop 204 to move on the desktop surface 26 without the use of a separate moveable platform.

The spherical roller assemblies 30 for the laptop computer 204 in FIG. 7 will be the same as the spherical roller assemblies 30 for the moveable platform 10 in FIG. 2 through 6.

The laptop computer requires at least three spaced spherical roller assemblies for movement across the desktop. The present embodiment has four spherical rollers; two spaced, opposed spherical rollers positioned in the front of the lower surface of the base structure of the laptop computer and two spaced, opposed spherical rollers positioned in the back of the lower surface of the base structure of the laptop computer.

The spherical rollers are positioned near the outer edges of the lower surface of the base structure for stability of the laptop computer at stationary rest and in motion. The spherical rollers are also positioned near the outer edges of the lower surface of the base structure to more evenly distribute the weight of the laptop computer on the desktop. The spherical rollers are approximately equidistant for those same stability and weight distribution requirements.

A braking mechanism 42 can be mounted in the lower surface 200 of the base structure 202 of the laptop computer 204 in front of the two front spherical rollers 30.

The braking mechanism 42 for the laptop computer in FIG. 7 will be the same as the braking mechanism 42 for the moveable platform 10 in FIG. 2 through FIG. 5.

The braking mechanism will elevate the front spherical roller assemblies from contact with the desktop, locking the laptop computer in position on the desktop. When the braking mechanism is released, the front spherical roller assemblies will be in contact with the desktop and the laptop will be moveable about the desktop.

Alternately, the braking mechanism may be internal with the bottom surface of the laptop computer with the two levers flush with the side surfaces of the laptop computer.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A moveable platform for a laptop computer, said laptop computer having a keyboard base structure and a display monitor, comprising
    a footer section, an angled support base and a header section;
    said angled support base supporting said keyboard base structure of said laptop computer at an angle relative to a computer user and said angled support base supporting and elevating said display monitor of said laptop computer relative to said computer user;
    said angled support base forming an airgap between said moveable platform and a desktop; said angled support base transferring heat from said keyboard base structure of said laptop computer through said angled support base to said airgap to dissipate said heat; said angled support base having a cooling fan system to transfer said heat from said keyboard base structure of said laptop computer through said angled support base to said airgap to dissipate said heat;

said footer section and said header section having a plurality of spherical roller assemblies contacting said desktop to move said moveable platform and said laptop computer supported on said moveable platform on a surface of said desktop;

each of said spherical roller assemblies having a single spherical ball surrounded by a plurality of spherical ball bearings within a semi-spherical cavity; said spherical ball being in physical contact with said spherical ball bearings but not in physical contact with said semi-spherical cavity; an annular retaining ring restraining said single spherical ball and said plurality of spherical ball bearings within said semi-spherical cavity; a portion of said spherical ball extending through a hole in said annular retaining ring to contact and revolve against said surface of said desktop to move said moveable platform and said laptop computer supported on said moveable platform on said surface of said desktop; and a braking mechanism in said footer section for elevating at least one of said spherical roller assemblies to remove at least one of said single spherical balls from contact with said surface of said desktop locking said moveable platform in a stationary position on said desktop and for lowering said at least one of said spherical roller assemblies to contact with said surface of said desktop to move said moveable platform and said laptop computer supported on said moveable platform on said surface of said desktop.

2. The moveable platform for a laptop computer of claim 1 wherein said angled support base is formed of an aluminum alloy.

3. The moveable platform for a laptop computer of claim 1 wherein said cooling fan system has at least one set of a fan blade, a motor to rotate said fan blade and a power source to drive said motor, said cooling fan system being positioned in at least one vent-hole extending from the upper surface of said angles support base to the lower surface of said support base; said airgap extending from said lower surface of said support base to said surface of said desktop.

4. The moveable platform for a laptop computer of claim 1 wherein said single spherical ball, said spherical ball bearings said semi-spherical cavity are formed of non-metallic materials.

5. The moveable platform for a laptop computer of claim 1 wherein said single spherical ball is formed of Teflon™, said spherical ball bearings are formed of Delrin™ and said semi-spherical cavity is formed of Nylon™.

6. The moveable platform for a laptop computer of claim 1 wherein said footer section has a ledge to contact the lower end of said base structure of said laptop computer to restrain the base structure of said laptop computer in position on said angled support base.

7. The moveable platform for a laptop computer of claim 1 wherein said braking mechanism has a first lever interconnected by a rotatable shaft through said footer section to a second lever, each of said first lever and said second levers having a handle and a brake, wherein raising said handle of said lever removes said brake of said lever from contact with said surface of said desktop to lower said at least one of said spherical roller assemblies to contact with said surface of said desktop to move said moveable platform and said laptop computer supported on said moveable platform on said surface of said desktop, and wherein lowering said handle of said lever moves said brake of said lever in contact with said surface of said desktop assemblies to remove at least one of said single spherical balls from contact with said surface of said desktop locking said moveable platform in a stationary position on said desktop.

8. The moveable platform for a laptop computer of claim 7 wherein each of said first and second levers is reverse J-shaped with said handle being flat and said brake being curved, said curve in said brake having a resistance material covering or a resistance material ridges.

9. A moveable platform for a laptop computer, said laptop computer having a keyboard base structure and a display monitor, comprising a footer section, an angled support base and a header section;

said angled support base supporting said keyboard base structure of said laptop computer at an angle relative to a computer user and said angled support base supporting and elevating said display monitor of said laptop computer relative to said computer user; said angled support base being formed of an aluminum alloy;

said footer section having a ledge to contact the lower end of said base structure of said laptop computer to restrain the base structure of said laptop computer in position on said angled support base;

said angled support base forming an airgap between said moveable platform and a desktop; said angled support base transferring heat from said keyboard base structure of said laptop computer through said angled support base to said airgap to dissipate said heat;

said angled support base having a cooling fan system which has at least one set of a fan blade, a motor to rotate said fan blade and a power source to drive said motor, said cooling fan system being positioned in at least one vent-hole extending from the upper surface of said angles support base to the lower surface of said support base; said airgap extending from said lower surface of said support base to said surface of said desktop; said cooling fans system transferring heated air from said keyboard base structure of said laptop computer through said at least one vent-hole in said angled support base to said airgap to dissipate said heat;

said footer section and said header section having a plurality of spherical roller assemblies contacting said desktop to move said moveable platform and said laptop computer supported on said moveable platform on a surface of said desktop;

each of said spherical roller assemblies having a single spherical ball surrounded by a plurality of spherical ball bearings within a semi-spherical cavity; said spherical ball being in physical contact with said spherical ball bearings but not in physical contact with said semi-spherical cavity; an annular retaining ring restraining said single spherical ball and said plurality of spherical ball bearings within said semi-spherical cavity; a portion of said spherical ball extending through a hole in said annular retaining ring to contact and revolve against said surface of said desktop to move said moveable platform and said laptop computer supported on said moveable platform on said surface of said desktop; wherein said single spherical ball is formed of Teflon™, said spherical ball bearings are formed of Delrin™ and said semi-spherical cavity is formed of Nylon™; and a braking mechanism in said footer section; said braking mechanism having a first lever interconnected by a rotatable shaft through said footer section to a second lever, each of said first lever and said second levers having a handle and a brake, each of said first and second levers is reverse J-shaped with said handle being flat and said brake being curved, said curve in said brake having a resistance material covering or a resistance material ridges; wherein raising said handle of said lever removes said brake of said lever from contact with said surface of said desktop to lower said at least one of said spherical roller assemblies to contact with said surface of said desktop to move said moveable platform and said laptop computer supported on said moveable platform on said surface of said desktop; and wherein lowering said handle of said lever moves said brake of said lever in contact with said surface of said desktop assemblies to remove at least one of said single spherical balls from contact with said surface of said desktop locking said moveable platform in a stationary position on said desktop.

10. A laptop computer comprising said laptop computer having a keyboard base structure and a display monitor, said keyboard base structure having a plurality of spherical roller assemblies contacting said desktop to move said laptop computer on a surface of a desktop;

each of said spherical roller assemblies having a single spherical ball surrounded by a plurality of spherical ball bearings within a semi-spherical cavity; said spherical ball being in physical contact with said spherical ball bearings but not in physical contact with said semi-spherical cavity; an annular retaining ring restraining said single spherical ball and said plurality of spherical ball bearings within said semi-spherical cavity; a portion of said spherical ball extending through a hole in said annular retaining ring to contact and revolve against said surface of said desktop to move said laptop computer on said surface of said desktop.

11. The laptop computer of claim 10 further comprising a braking mechanism in said keyboard base structure for elevating at least one of said spherical roller assemblies to remove at least one of said single spherical balls from contact with said surface of said desktop locking said laptop computer in a stationary position on said desktop and for lowering said at least one of said spherical roller assemblies to contact with said surface of said desktop to move said laptop computer on said surface of said desktop.

12. The laptop computer of claim 10 wherein said single spherical ball, said spherical ball bearings said semi-spherical cavity are formed of non-metallic materials.

13. The laptop computer of claim 10 wherein said single spherical ball is formed of Teflon™, said spherical ball bearings are formed of Delrin™ and said semi-spherical cavity is formed of Nylon™.

14. The laptop computer of claim 10 wherein said braking mechanism has a first lever interconnected by a rotatable shaft through said laptop computer to a second lever, each of said first lever and said second levers having a handle and a brake, wherein raising said handle of said lever removes said brake of said lever from contact with said surface of said desktop to lower said at least one of said spherical roller assemblies to contact with said surface of said desktop to move said laptop computer on said surface of said desktop, and wherein lowering said handle of said lever moves said brake of said lever in contact with said surface of said desktop assemblies to remove at least one of said single spherical balls from contact with said surface of said desktop locking said laptop computer in a stationary position on said desktop.

15. The laptop computer of claim 14 wherein each of said first and second levers is reverse J-shaped with said handle being flat and said brake being curved, said curve in said brake having a resistance material covering or a resistance material ridges.

* * * * *